United States Patent [19]

Soehngen

[11] 4,276,179

[45] Jun. 30, 1981

[54] REMOVING HALOGENATED HYDROCARBONS FROM AQUEOUS MEDIA BY UTILIZING A POLYOLEFINIC MICROPOROUS ADSORBENT

[75] Inventor: John W. Soehngen, Berkeley Heights, N.J.

[73] Assignee: Celanese Corporation, New York, N.Y.

[21] Appl. No.: 44,803

[22] Filed: Jun. 1, 1979

[51] Int. Cl.$^3$ .............................................. B01D 15/00
[52] U.S. Cl. .................................... 210/679; 210/692; 210/909
[58] Field of Search ..................... 210/24, 36, 40, 660, 210/679, 692, 909; 426/490, 491

[56] References Cited

U.S. PATENT DOCUMENTS

| | | | |
|---|---|---|---|
| 3,681,237 | 8/1972 | Orban et al. | 210/36 |
| 3,800,510 | 4/1974 | Lamond | 55/158 |
| 3,801,404 | 4/1974 | Druin et al. | 156/212 |
| 3,839,516 | 10/1974 | Williams et al. | 264/171 |
| 4,042,498 | 8/1977 | Kennedy | 210/40 |

*Primary Examiner*—Ivars C. Cintins
*Attorney, Agent, or Firm*—Kenneth A. Genoni

[57] ABSTRACT

Halogenated hydrocarbons, such as 1,1,1-trichloro-2,2-bis(chlorophenyl) ethane (DDT) and polychlorinated biphenyls (PCB), are removed from aqueous media including waste water from chemical manufacturing operations by contacting the aqueous media with an effective amount of a polyolefinic microporous adsorbent, preferably in the form of a filter or cartridge.

17 Claims, No Drawings

REMOVING HALOGENATED HYDROCARBONS FROM AQUEOUS MEDIA BY UTILIZING A POLYOLEFINIC MICROPOROUS ADSORBENT

BACKGROUND OF THE INVENTION

1. Field of the Invention

This invention relates to the use of an adsorbent to remove halogenated hydrocarbons from aqueous solutions.

2. Summary of the Prior Art

It has been observed that waste streams from many industrial operations halogenated hydrocarbon compounds which find their way into drinking water supplies. It has been further observed that water run off from agricultural operations employing pesticides also contributes to the presence of these halogenated organic compounds in the drinking water.

Moreover, in certain areas of the country there is a substantial amount of free chlorine dissolved in drinking water supplies. It is well known that the presence of these halogenated organic compounds and free chlorine in water adversely affects its taste and odor as well as the taste and odor of other commonly consumed drinks prepared therefrom such as beverages, brewed coffee and the like.

Although the use of many of these compounds such as polychlorinated biphenyls (PCB), 1,1,1-trichloro-2, 2,-bis(chlorophenyl) ethane (DDT), chlorodane and the like have been banned or severely limited because of their carcinogenic properties, their persistence in the environment will continue for years to come.

It is known that certain polyolefin polymers such as polypropylene and polyethylene may be utilized to absorb oil from the surface of water as evidence by U.S. Pat. Nos. 3,146,192; 3,147,216; 3,674,683; 3,668,118; and 3,966,597. It is also known that a variety of polymers may be utilized as adsorbents for hydrocarbon compounds present in aqueous media, such as illustrated by U.S. Pat. Nos. 3,852,490 and 3,936,394.

A heat shrunk microporous film impregnated with a dielectric impregnant which includes various oils to yield a dielectric insulation material is disclosed in Canadian Pat. No. 987,971.

The search has continued, however, for new ways to remove significant amounts of dissolved chlorine and halogenated hydrocarbons such as DDT and PCB's from aqueous media. The present invention was made as a result of such a search.

Accordingly, an object of the present invention is to provide a process for removing molecular and elemental halogens such as chlorine gas and non-polymeric halogenated hydrocarbons from aqueous media including water to be utilized for eventual consumption as drink or in foods.

It is a further object of the present invention to provide a filter device adapted to remove non-polymeric halogenated hydrocarbons and molecular and elemental halogens from aqueous media.

These and other objects, as well as the scope, nature and utilization of the claimed invention will be apparent to those skilled in the art from the following detailed description and appended claims.

SUMMARY OF THE INVENTION

In one aspect of the present invention, a process is provided for removing non-polymeric halogenated hydrocarbons and molecular and elemental halogens selected from at least one member of the group consisting of chlorine, fluorine bromine and iodine from an aqueous media which comprises contacting said aqueous media with a polyolefinic microporous adsorbent having a surface area of from about 10 to about 40 square meters per gram of adsorbent.

In another aspect of the present invention, a process is provided for removing a halogen containing substance selected from at least one member of the group consisting of (a) non-polymeric halogenated hydrocarbons, and (b) molecular and elemental halogens selected from at least one member of the group consisting of chlorine, fluorine, bromine, and iodine from an aqueous medium containing about 0.001 ppm to 10 ppm of said halogen containing substance which comprises (a) impregnating a polyolefinic microporous adsorbent having a surface area of from about 10 to about 40 square meters per gram of adsorbent with an organic solvent selected from at least one member of the group consisting of saturated and unsaturated oils, waxes and fats; and (b) contacting said aqueous medium with said microporous adsorbent having the organic solvent impregnated therein.

In another aspect of the present invention, a filter is provided which filter comprises a polyolefinic microporous adsorbent adapted to be attached or located in a water conduit in a manner effective to remove non-polymeric halogenated hydrocarbons and molecular and elemental halogens selected from at least one member of the group consisting of chlorine, fluorine, bromine, and iodine from aqueous media.

In still another aspect of the present invention, a cartridge filter is provided which filter comprises a polyolefinic microporous adsorbent adapted to be attached or located in a water conduit in a manner effective to remove non-polymeric halogenated hydrocarbons and molecular and elemental halogens selected from at least one member of the group consisting of chlorine, fluorine, bromine, and iodine from water passing through the conduit.

DESCRIPTION OF THE PREFERRED EMBODIMENTS

The process of this invention is generally applicable to the purification of any aqueous medium which contains minor amounts of halogen containing substances herein defined to include non-polymeric halogenated hydrocarbon compounds as well as the molecular and elemental halogens of chlorine, fluorine, bromine and iodine, the molecular halogens being illustrated by chlorine and fluorine gas, and the elemental halogens being illustrated by elemental bromine and iodine.

An aqueous medium is herein defined to be any aqueous based composition which comprises at least 50% by weight water and which contains halogen containing substances of the type described herein either in dissolved or insolubilized form. Such substances will typically be present in aqueous media such as water in amounts which can vary from about 0.001 to about 10 ppm, typically from about 0.01 to about 10 ppm, and preferably from about 0.1 to about 10 ppm based on the weight of the solution.

The halogenated hydrocarbons which may be removed from aqueous media include any chlorinated, fluorinated, brominated or iodated non-polymeric (e.g. not greater than 30 carbon atoms) hydrocarbon compounds which are typically present in aqueous media, particularly those aqueous media utilized for eventual consumption as drink or in foods.

The non-polymeric halogenated hydrocarbons which may be removed from aqueous media include aliphatic, cycloaliphatic, and heterocyclic halogenated hydrocarbons of about 1 to about 30 carbon atoms; aromatic halogenated hydrocarbons and their derivatives of about 6 to about 30 carbon atoms, including alkyl substituted aromatic halogenated hydrocarbons of about 7 to about 30 carbon atoms. Such halogenated aromatic hydrocarbons are typically employed as pesticides.

Representative examples of non-polymeric halogenated chlorinated hydrocarbons and their derivatives include polychlorinated biphenyls, such as the AROCHLOR$^{TM}$ series of compounds manufactured by Monsanto Company designated AROCHLOR$^{TM}$ 1221; 1232; 1242; 1248; 1254; 1260; 1262; 1268; 1270; 4465; 5442; 5460; and 2565. The last two digits of each AROCHLOR$^{TM}$ number identifies the chlorine content in % by gram molecular weight, based on the gram molecular weight of the compound or mixture of compounds. For a further discussion of the properties of these compounds see Kirk-Othimer Encyclopedia of Chemical Technology 289-293 (2nd Ed. 1964).

Specific common chlorobiphenyl compounds include 2-chlorobiphenyl; 3-chlorobiphenyl; 4-chlorobiphenyl; 2,2'-dichlorobiphenyl; 3,3'-dichlorobiphenyl; 4,4'-dichlorobiphenyl; 3,5-dichlorobiphenyl; 2,5-dichlorobiphenyl; 3,4-dichlorobiphenyl; 2,3-dichlorobiphenyl; 2,4'-dichlorobiphenyl; 2,4,5-trichlorobiphenyl; 2,3,5-trichlorobiphenyl; 2,4,4'-trichlorobiphenyl; 2,5,4'-trichlorobiphenyl; 3,5,4'-trichlorobiphenyl; 3,4,2'-trichlorobiphenyl; 3,5,2'-trichlorobiphenyl; 3,4,3',4'-tetrachlorobiphenyl; 3,4,2',5'-tetrachlorobiphenyl; 2,6,2',6'-tetrachlorobiphenyl; 2,5,3',5'-tetrachlorobiphenyl; 2,4,2',4'-tetrachlorobiphenyl; 2,5,2',5'-tetrachlorobiphenyl; 2,4,5,3',4'-pentachlorobiphenyl; 3,4,5,3',4',5'-hexachlorobiphenyl; 2,4,6,2',4',6'-hexachlorobiphenyl; 2,3,4,5,2',4',5'-heptachlorobiphenyl; 2,3,5,6,2',3',5',6'-octachlorobiphenyl; 2,3,4,5,6,2',3',4',5',6'-decachlorobiphenyl.

Other representative examples of chlorinated hydrocarbons include N-(trichloromethylthio)phthalimide (PHALTAN Fungicide); 1,2,3,3,10,10-hexachloro-1,4,4a,5,8,8a-hexahydro 1,4,5,8-endo-dimethanonaphthalene (aldrin); 1,2,3,4,10,10-hexachloro-6, 7-epoxy-1,4,4a,5,6,7,8,8a-octahydro-1,4-endo, exo-5,8 dimethanonaphthalene (dieldrin); 1,2,3,4,10,10-hexachloro-6,7 epoxy-1,4,4a,5,6,7,8,8a-octahydro-1,4-endo-5,8-dimethanonaphthalene (endrin); dichlorodiphenyldichloroethylene (DDE); dichlorodiphenyldichloroethane (DDD); and 1,1,1,trichloro-2,2-bis(chlorophenyl) ethane (DDT) octachloro-4,7-methanotetrahydroindane (chlordane); N-trichloromethylthio or N-tetrachloroethylthio substituted (haloalkyl sulfenylated) carboximides such as cis-N-(trichloromethylthio)-4-cyclohexene-1,2-dicarboximide (captan); N-(1,1,2,2-tetrachloroethylthio)-4-cyclohexene-1,2-dicarboximide (DIFOLATAN Fungicide); toxaphene, carbon tetrachloride, trichloroethylene, trichloromethane, vinyl chloride, and ethylene dichloride.

Representative examples of brominated fluronated, iodated aliphatic, cycloaliphatic aromatic and heterocyclic hydrocarbons include bromoethane; 3-(p-bromophenyl)-1-methoxy-1-methylurea; isopropyl 4,4'-dibromo-benzilate; 3,5-dibromo-4-hydroxybenzonitrile; 3,5-dibromo-4-octanoyloxybenzonitrile; 1,2-dibromoethane; sodium fluoroacetate; $\alpha$, $\alpha$, $\alpha$ -trifluoro-2,6-dinitro-N, N-dipropyl-p-toluidine; N-n-propyl-N-cyclopropylmethyl-4-trifluoromethyl-2,6-dinitroaniline; $N^3$,$N^3$-diethyl-2,4-dinitro-6-trifluoromethyl-m-phenylene diamine; p-nitrophenyl $\alpha,\alpha$, $\alpha$,-trifluoro-2-nitro-p-tolylether; 2,3,5-triiodobenzoic acid; 1,2-dibromo-2,2-dichloroethyl dimethylphosphate; 0-(4-bromo-2,5-dichlorophenyl)-0-methylphenylphosphonothioate; 3-(4-bromo-3-chlorophenyl)-1-methoxy-1-methylurea; phenyl 5,6-dichloro-2-trifluoro methyl-benzimidazole-1-carboxylate; 1,2-dibromo-3-chloropropane;

For additional halogenated hydrocarbons which may be employed in the present invention, see O. Johnson, *Pesticides '72* Parts 1 and 2, Chemical Week, June 21, pp. 33-64, July 26, pp. 17-46 (1972) which is herein incorporated by reference.

It is appropriate to mention that DDT is generally understood to comprise a mixture of the para, para' isomer with the ortho, para' isomer (ortho, para'-dichlorodiphenyltrichloroethane, o,p'-DDT, or trichloro-ortho-chlorophenyl-para-chlorophenylethane) wherein the para, para' isomer comprises about 60 to 70% of the mixture.

The aqueous medium from which the halogenated hydrocarbons are removed may be obtained from any source provided additional substances which would significantly adversely influence the microporous adsorbent are not also present therein. The process of the present invention is particularly advantageous when the aqueous medium is ultimately intended to be utilized for consumption as drink or in food. Accordingly, the aqueous medium containing the halogenated hydrocarbons may be provided from municipal water sources, (e.g., municipal drinking water), effluent waste water produced by chemical manufacturing plants, liquid foods such as milk, fermented and non-fermented juice extracts, such as wine, beer, fruit juices, and the like.

The "microporous adsorbent" which may be utilized in the process of the presently claimed invention is herein defined to consist essentially of a polyolefinic microporous film or derivative configurations obtained therefrom.

The amount of halogen containing substance which is adsorbed by the microporous adsorbent is believed to be a function of the base chemical structure of the adsorbent assuming sufficient time is allowed for the adsorption process to reach equilibrium.

It is further believed that polymers prepared from olefinic materials of the type described herein possess a specific affinity for the halogenated substances described herein. It is this affinity which is utilized in accordance with the present invention in providing the microporous adsorbent. The preferred polymers which exhibit this affinity are polyethylene and polypropylene.

The rate of adsorption of the halogenated substances is believed to be a function of the surface area of the microporous adsorbent. The surface area of the microporous adsorbent of the present invention can vary from about 10 to about 40, preferably from about 20 to about 40 and most preferably from about 30 to about 40 square meters per gram of adsorbent. Such surface area is achieved by providing the adsorbent of the present invention with micropores having an average pore size (i.e., diameter) of about 100 to about 20,000 angstroms and preferably from about 200 to about 12,000 angstroms (e.g. 200 and 5000 angstroms), the values being determined by mercury porosimetry as discussed in an article by R. G. Ouynn et al at 21–34 of the Textile Research Journal, January 1963.

Thus, it has been found that an olefinic polymer when rendered in the configuration of a microporous film, is capable of efficiently adsorbing halogenated substances of the type described herein from aqueous media.

The microporous adsorbent of the present invention possessing the surface area and average pore size described above is preferably provided from microporous films of the type described herein.

Porous or cellular films can be classified into two general types: one type in which the pores are not interconnected, i.e., a closed-cell film, and the other type in which the pores are essentially interconnected through tortuous paths which may extend from one exterior surface or surface region to another, i.e., an open-celled film. The porous films of the present invention are of the latter type.

Further, the pores of the microporous films of the present invention are microscopic, i.e., the details of their pore configuration or arrangement are discernible only by microscopic examination. In fact, the open cells or pores in the films prepared by the "dry stretch" or "solvent stretch" techniques described herein generally are smaller than those which can be measured using an ordinary light microscope, because the wavelength of visible light, which is about 5,000 Angstroms (an Angstrom is one tenbillionth of a meter), is longer than the longest planar or surface dimension of the open cell or pore. The microporous films prepared by the "solvent stretch" or "dry stretch" methods may be identified, however, by using electron microscopy techniques which are capable of resolving details of pore structure below 5,000 Angstroms.

The microporous films of the present invention are also characterized by a reduced bulk density, sometimes hereinafter referred to simply as a "low" density. That is, these microporous films have a bulk or overall density lower than the bulk density of corresponding films composed of identical polymeric materials but having no open celled or other voidy structure. The term "bulk density" as used herein means the weight per unit of gross or geometric volume of the film, where gross volume is determined by immersing a known weight of the film in a vessel partly filled with mercury at 25° C. and atmospheric pressure. The volumetric rise in the level of mercury is a direct measure of the gross volume. This method is known as the mercury volumenometer method, and is described in the *Encyclopedia of Chemical Technology*, Vol. 4, page 892 (Interscience 1949). Thus, the adsorbent (e.g., porous film) of the present invention possess a microporous open-celled structure, and is also characterized by a reduced bulk density. Films possessing this microporous structure are described, for example, in U.S. Pat. No. 3,426,754 which patent is assigned to the assignee of the present invention and is herein incorporated by reference. The preferred method of preparation described therein involves drawing or stretching at ambient temperatures, i.e., "cold drawing", a crystalline, elastic precursor film in an amount of about 10 to 300 percent of its original length, with subsequent stabilization by heat setting of the drawn film under a tension such that the film is not free to shrink or can shrink only to a limited extent. Other methods of preparing microporous films are exemplified by U.S. Pat. Nos. 3,558,764; 3,843,761; 3,920,785; British Pat. Nos. 1,180,066 and 1,198,695 which are all herein incorporated by reference.

While all of the above listed patents describe processes for preparing a microporous film suitable for use in the present invention, the preferred microporous films are provided in accordance with the processes described in U.S. Pat. No. 3,801,404 which defines a method for preparing microporous films herein referred to as the "dry stretch" method and U.S. Pat. No. 3,839,516 which defines a method for preparing microporous films herein referred to as the "solvent stretch" method, both of which are herein incorporated by reference. Each of these patents discloses preferred alternative routes for obtaining a microporous film by manipulating a precursor film in accordance with specifically defined process steps. It has been found that polyolefinic microporous films of the type described herein and preferably prepared in accordance with either of these two processes possess the ability to adsorb extremely small amounts of halogenated substances of the type described herein which are present in drinking water supplies.

The preferred precursor films which may be utilized in accordance with each process are specifically detailed in each of these patents. Thus, the "dry stretch" method utilizes a non-porous crystalline, elastic, polymer film having an elastic recovery at zero recovery time (hereinafter defined), when subjected to a standard strain (extension) of 50 percent at 25° C. and 65 percent relative humidity, of at least 40 percent, preferably at least about 50 percent, and most preferably at least about 80 percent.

Elastic recovery as used herein is a measure of the ability of a structured or shaped article such as a film to return to its original size after being stretched, and may be calculated as follows:

$$\text{Elastic Recovery (ER \%)} = \frac{\text{length when stretched} - \text{length after stretching}}{\text{length added when stretched}} \times 100$$

Although a standard strain of 50 percent is used to identify the elastic properties of the starting films, such strain is merely exemplary. In general, such starting films will have elastic recoveries higher at strains less than 50 percent, and somewhat lower at strains substantially higher than 50 percent, as compared to their elastic recovery at a 50 percent strain.

These starting elastic films will also have a percent crystallinity of at least 20 percent, preferably at least 30 percent, and most preferably at least 50 percent, e.g., about 50 to 90 percent, or more. Percent crystallinity is determined by the X-ray method described by R. G. Quynn et al in the *Journal of Applied Polymer Science*, Vol. 2, No. 5, pp. 166–173 (1959). For a detailed discussion of crystallinity and its significance in polymers, see *Polymers and Resins*, Golding (D. Van Nostrand, 1959).

Other elastic films considered suitable for preparing percursor films utilized in the "dry stretch" method are described in British Pat. No. 1,052,550, published Dec. 21, 1966.

The precursor elastic film utilized in the preparation of the microporous films by the "dry stretch" process route should be differentiated from films formed from classical elastomers such as the natural and synthetic rubbers. With such classical elastomers the stress-strain behavior, and particularly the stress-temperature relationship, is governed by entropy-mechanism of deformation (rubber elasticity). The positive temperature coefficient of the retractive force, i.e., decreasing stress with decreasing temperature and complete loss of elastic properties at the glass transition temperatures, are particular consequences of entropy-elasticity. The elasticity of the precursor elastic films utilized herein, on the other hand, is of a different nature. In qualitative thermodynamic experiments with these elastic precursor films, increasing stress with decreasing temperature (negative temperature coefficient) may be interpreted to mean that the elasticity of these materials is not governed by entropy effects but dependent upon an energy term. More significantly, the "dry stretch" precursor elastic films have been found to retain their stretch properties at temperatures where normal entropy-elasticity could no longer be operative. Thus, the stretch mechanism of the "dry stretch" precursor elastic films is thought to be based on energy-elasticity relationships, and these elastic films may then be referred to as "non-classical" elastomers.

Alternatively, the "solvent stretch" method utilizes a precursor film which must contain at least two components, e.g., an amorphous component and a crystalling component one of which has a greater affinity for the chosen swelling agent than the other components. Thus, crystalline materials which are by nature two components work well with this process. The degree of crystallinity of the precursor film must therefor be at least 30% by volume of the precursor film.

The polymers, i.e., synthetic resinous materials from which the precursor films utilized in either process in accordance with the present invention include the olefin polymers, such as polyethylene, polypropylene, poly-3-methyl butene-1, poly-4-methyl pentene-1, as well as copolymers of propylene, 3-methyl butene-1, 4-methyl pentene-1, or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, n-octadecene-1, or other relatively long chain alkenes, as well as copolymers of 3-methyl pentene-1 and any of the same n-alkenes mentioned previously in connection with 3-methyl butene-1.

For example, when propylene homopolymers are contemplated for use in the "dry stretch" method, it is preferred to employ an isotatic polypropylene having a percent crystallinity as indicated above, a weight average molecular weight ranging from about 100,000 to 750,000, preferably about 200,000 to 500,000 and a melt index (ASTM-1958D-1238-57T, Part 9, page 38) from about 0.1 to about 75, preferably from about 0.5 to 30, so as to give a final film product having the requisite physical properties.

It is to be understood that the terms "olefinic polymer" and "olefin polymer" are used interchangeably and are intended to describe polymers prepared by polymerizing olefin monomers through their unsaturation.

Preferred polymers for use in the "solvent stretch" method are those olefin polymers utilized in accordance with the invention described in U.S. Pat. application Ser. No. 44,805, filed on June 1, 1979, entitled "Improved Solvent Stretch Process for Preparing Microporous Films from Precursor Films of Controlled Crystalline Structure" the disclosure of which is herein incorporated by reference. Thus, a polyethylene homopolymer having a density of from about 0.960 to about 0.965 gm/cc, a melt index from about 3 to about 20 (in the absence of nucleating agents) and a broad molecular weight distribution ratio ($\overline{M}_w/\overline{M}_n$) of not less than 3.8 and preferably from about 3.8 to about 13 is preferred in preparing a microporous film by the preferred "solvent stretch" method. Nucleating agents can be incorporated into the polymer to permit reduction of the melt index to about 0.3.

The types of apparatus suitable for forming the precursor films are well known in the art.

For example, a conventional film extruder equipped with a shallow channel metering screw and coat hanger die, is satisfactory. Generally, the resin is introduced into a hopper of the extruder which contains a screw and a jacket fitted with heating elements. The resin is melted and transferred by the screw to the die from which it is extruded through a slot in the form of a film from which it is drawn by a take-up or casting roll. More than one take-up roll in various combination or stages may be used. The die opening or slot width may be in the range, for example, of about 10 to 200 mils preferably 40 to 100 mils.

Using this type of apparatus, film may be extruded at a drawdown ratio of about 5:1 to 200:1, preferably 10:1 to 50:1.

The terms "drawdown ratio" or, more simply, "draw ratio", as used herein is the ratio of the film wind-up or take-up speed to the speed of the film issuing at the extrusion die.

The melt temperature for film extrusion is, in general, no higher than about 100° C. above the melting point of the polymer and no lower than about 10° C. above the melting point of the polymer.

For example, polypropylene may be extruded at a melt temperature of about 180° C. to 270° C. preferably 200° C. to 240° C. Polyethylene may be extruded at a melt temperature of about 175° C. to 225° C.

When the precursor film is to be utilized in accordance with the "dry stretch" method, the extrusion operation is preferably carried out with rapid cooling and rapid drawdown in order to obtain maximum elasticity. This may be accomplished by having the chill roll take-up relatively close to the extrusion slot, e.g., within two inches and, preferably, within one inch. an "air knife" operating at temperatures between, for example 0° C. and 40° C., may be employed within one inch of the slot to quench, i.e., quickly cool and solidify the film. The take-up roll may be rotated for example, at a speed of 10 to 1000 ft/min, preferably 50 to 500 ft/min.

When the precursor film is to be utilized in accordance with the "solvent stretch" method, the extrusion operation is preferably carried out with slow cooling in order to minimize stress and any associated orientation which might result from a fast quench to obtain maximum crystallinity but yet fast enough to avoid developing large spherulities. This may be accomplished by controlling the distance of the chill roll take-up from the extrusion slot.

While the above description has been directed to slit die extrusion methods, an alternative method of forming the precursor films contemplated in this invention is the blown film extrusion method wherein a hopper and an extruder are employed which are substantially the same as in the slit die extruder described above.

From the extruder, the melt enters a die from which it is extruded through a circular slot to form a tubular film having an initial diameter $D_1$. Air enters the system through an inlet into the interior of said tubular film and has the effect of blowing up the diameter of the tubular film to a diameter $D_2$. Means such as air rings may also be provided for directing the air about the exterior of extruded tubular film so as to provide different cooling rates. Means such as a cooling mandrel may be used to cool the interior of the tubular film. After a distance during which the film is allowed to completely cool and harden, it is wound up on a take-up roll.

Using the blown film method, the drawdown ratio is preferably 5:1 to 100:1, the slot opening 10 to 200 mils, the $D_2/D_1$ ratio, for example, 1.0 to 4.0 and preferably about 1.0 to about 2.5, and the take-up speed, for example, 30 to 700 ft/min. The melt temperature may be within the ranges given previously for slit die extrusion.

The extruded film may then be initially heat treated or annealed in order to improve crystal structure, e.g., by increasing the size of the crystallites and removing imperfections therein. Generally, this annealing is carried out at a temperature in the range of about 5° to 100° C. below the melting point of the polymer for a period of a few seconds to several hours, e.g., 5 seconds to 24 hours, and preferably from about 30 seconds to 2 hours. For polypropylene, the preferred annealing temperature is about 100° C. to 150° C.

An exemplary method of carrying out the annealing is by placing the extruded film in a tensioned or tensionless state in an oven at the desired temperature in which case the residence time is preferably in the range of about 30 seconds to 1 hour.

In the preferred embodiments, the resulting partly-crystalline precursor film is preferably sujected to one of the two alternative procedures described above to obtain a microporous film which may be utilized in accordance with the present invention.

The first preferred procedure is disclosed in U.S. Pat. No. 3,801,404 herein referred to as the "dry stretch" method includes the steps of cold stretching, i.e., cold drawing, the elastic film until porous surface regions or areas which are elongated normal or perpendicular to the stretch direction are formed, (2) hot stretching, i.e., hot drawing, the cold stretched film until fibrils and pores or open cells which are elongated parallel to the stretch direction are formed, and thereafter (3) heating or heat-setting the resulting porous film under tension, i.e., at substantially constant length, to impart stability to the film.

The term "cold stretching" as used herein is defined as stretching or drawing a film to greater than its original length and at a stretching temperature, i.e., the temperature of the film being stretched, less than the temperature at which melting begins when the film is uniformly heated from a temperature of 25° C. and at a rate of 20° C. per minute. The term "hot stretching" as used herein is defined as stretching above the temperature at which melting begins when the film is uniformly heated from a temperature of 25° C. and at a rate of 20° C. per minute, but below the normal melting point of the polymer, i.e., below the temperature at which fusion occurs. As is known to those skilled in the art, the temperature at which melting begins and the fusion temperature may be determined by a standard differential thermal analyzer (DTA), or by other known apparatus which can detect thermal transitions of a polymer.

The temperature at which melting begins varies with the type of polymer, the molecular weight distribution of the polymer, and the crystalline morphology of the film. For example, polypropylene elastic film may be cold stretched at a temperature below about 120° C. preferably between about 10° C. and 70° C. and conveniently at ambient temperature, e.g., 25° C. The cold stretched polypropylene film may then be hot stretched at a temperature above about 120° C. and below the fusion temperature, and preferably between about 130° C. and about 150° C. Again, the temperature of the film itself being stretched is referred to herein as the stretch temperature. The stretching in these two steps or stages must be consecutive, in the same direction, and in that order, i.e., cold then hot, but may be done in a continuous, semi-continuous, or batch process, as long as the cold stretched film is not allowed to shrink to any significant degree, e.g., less than 5 percent of its cold stretched length, before being hot stretched.

The sum total amount of stretching in the above two steps may be in the range of about 10 to 300 percent and preferably about 50 to 150 percent, based on the initial length of the elastic film. Further, the ratio of the amount of hot stretching to the sum total amount of stretching or drawing may be from above about 0.10:1 to below 0.99:1, preferably from about 0.50:1 to 0.95:1. This relationship between the "cold" and "hot" stretching is referred to herein as the "extension ratio" (percent "hot" extension to the percent "total" extension).

In any stretching operations where heat must be supplied the film may be heated by heat supplied by the moving rolls which may in turn be heated by an electrical resistance method, by passage over a heated plate, through a heated liquid, a heated gas, or the like.

After the above-described two stage or two step stretching, the stretched film is heat set. This heat treatment may be carried out at a temperature in the range from about 125° C. up to less than the fusion temperature, and preferably about 115° to 130° C., for polyethylene, and at similar temperature ranges for other of the above mentioned polymers. This heat treatment should be carried out while the film is being held under tension, i.e., such that the film is not free to shrink or can shrink to only a controlled extent not greater than about 15 percent of its stretched length, but not so great a tension as to stretch the film more than an additional 15 percent. Preferably, the tension is such that substantially no shrinkage or stretching occurs, e.g., less than 5 percent change in stretched length.

The period of heat treatment which is preferably carried out sequentially with and after the drawing operation, should not be longer than 0.1 second at the higher annealing temperatures and, in general, may be within the range of about 5 seconds to 1 hour and preferably about 1 to 30 minutes.

The above described setting steps may take place in air, or in other atmospheres such as nitrogen, helium, or argon.

A second preferred alternative procedure for converting the precursor film to a microporous film as described in U.S. Pat. No. 3,839,516 and herein referred to as the "solvent stretch" method includes the steps of (1) contacting the precursor film having at least two components i.e. an amorphous component and a crystalline component, one of which is lesser in volume than all the other components, with a swelling agent for sufficient time to permit adsorption of the swelling agent into the film; (2) stretching the film in at least one direction while in contact with swelling agent, and (3) maintaining the film in its stretched state during removal of the swelling agent. Optionally, the film may be subsequently furthe stretched in one or more directions, and/or stabilized by heat-setting under tension or by ionizing radiation.

Generally, a solvent having a Hildebrand solubility parameter at or near that of the polymer would have a solubility suitable for the drawing process described herein. The Hildebrand solubility parameter measures the cohesive energy density. Thus, the underlying principle relies on the fact that a solvent with a similar cohesive energy density as a polymer would have a high affinity for that polymer and would be adequate for this process.

General classes of swelling agents from which one appropriate for the particular polymeric film may be chosen are lower aliphatic ketones such as acetone, methyl ethylketone, cyclohexanone; lower aliphatic acid esters such as ethyl formate, butyl acetate, etc.; halogenated hydrocarbons such as carbon tetrachloride, trichloroethylene, perchloroethylene, chlorobenzene, etc.; hydrocarbons such as heptane, cyclohexane, benzene, xylene, tetralin, decalin, etc.; nitrogen-containing organic compounds such as pyridine, formamide, dimethylformamide, etc.; ethers such as methyl ether, ethyl ether, dioxane, etc. A mixture of two or more of these organic solvents may also be used.

It is preferred that the swelling agents be a compound composed of carbon, hydrogen, oxygen, nitrogen, halogen, sulfur and contain up to about 20 carbon atoms, preferably up to about 10 carbon atoms.

The solvent stretching step may be conducted at a temperature in the range of from above the freezing point of the solvent, or swelling agent, to a point below the temperature at which the polymer dissolves e.g., ambient termperature to about 80° C. (e.g. 70° C.) for trichloroethylene and to about 100° to 105° C. (e.g. 80° to 95° C.) for perchloroethylene solvent.

The precursor film employed in the "solvent stretch" process may range from 0.1 to about 20 mils, preferably from about 1 to about 8 mils.

In a preferred embodiment the precursor film is biaxially stretched in accordance with the procedures described in U.S. Pat. No. 4,257,997.

Entitled "Improved Solvent Stretching Process for Preparing Microporous Films" the disclosure of which is herein incorporated by reference. This process identifies preferred stretching conditions in a uniaxial direction which lead to improved permeability of a uniaxially stretched microporous film. The uniaxially stretched film can then be stretched in a transverse direction to improve the permeability even further. Thus, it is preferred that the precursor film be uniaxially stretched not greater than about 350% and most preferably about 300% greater than its original length. Typically, uniaxialy stretching of the film after solvent removal is not employed.

The optional stabilizing step may be either a heat-setting step or a cross-linking step. This heat treatment may be carried out at a temperature in the range from about 125° C. up to less than the fusion temperature, and preferably about 130° to 150° C. for polypropylene; from about 75° C. up to less than fusion temperature, and preferably about 115 to 130° C. for polyethylene, and at similar temperature ranges for other of the above mentioned polymers. This heat treatment should be carried out while the film is being held under tnesion, i.e., such that the film is not free to shrink or can shrink to only a controlled extent not greater than about 15 percent of its stretched length, but not so great a tension as to stretch the film more than an additional 15 percent. Preferably, the tension is such that substantially no shrinkage or stretching occurs, e.g., less than 5 percent change in stretched length.

The period of heat treatment which is preferably carried out sequentially with and after the drawing operation, shouldn't be longer than 0.1 second at the higher annealing temperatures and, in general, may be within the range of about 5 seconds to 1 hour and preferably about 1 to 30 minutes.

The above described setting steps may take place in air, or in other atmospheres such as nitrogen, helium or argon. The after-stretching just described is what is termed "cold stretching" as defined above.

When the precursor film is biaxially stretched the stabilizing steps should be conducted after transverse stretching and not before.

The microporous films prepared by the "solvent stretch" or "dry stretch" method, in a tensionless state, have a lowered bulk density compared with the density of corresponding polymeric materials having no open-celled structure, e.g., those from which it is formed. Thus, the films have a bulk density no greater than about 95 percent and preferably 20 to 40 percent of the precursor film. Stated another way, the bulk density is reduced by at least 5 percent and preferably 60 to 80 percent. For polyethylene , the reduction is 30 to 80 percent, preferably 60 to 80 percent. The bulk density is also a measure of porosity, that is, where the bulk density is about 20 to 40 percent of the stretching material, the porosity has been increased by 60 to 80 percent because of the pores or holes.

The final crystallinity of these microporous films is preferably at least 30 percent, more preferably at least 65 percent, and more suitably about 70 to 85 percent, as determined by the X-ray method described by R. G. Quynn et al in the *Journal of Applied Polymer Science,* Vol. 2, No. 5, pp. 166–173. For a detailed discussion of crystallinity and its significance in polymers, see *Polymers and Resins,* Golding (D. Van Nostrand, 1959).

The microporous films prepared by the "dry stretch" or "solvent stretch" methods may also have an average pore size less than about 5000 Å, typically from about 200 to 5000 Å, and more typically 500 to 3000 Å. These values can be determined by mercury porosimetry as described in an article by R. G. Quynn et al, on pages 21–34 of *Textile Research Journal,* January, 1963 or by the use of electron microscopy as described in Geil's *Polymer Single Crystals,* p. 69 (Interscience 1963). When an electron micrograph is employed pore length and width measurements can be obtained by simply utilizing a ruler to directly measure the length and width of the pores on an electron micrograph taken usually at 5,000 tp 10,000 magnification. Generally, the pore length values obtainable by electron microscopy are approximately equal to the pore size values obtained by mercury porosimetry.

Microporous films will exhibit a surface area within certain predictable limits when prepared by either the "solvent stretch" method or the "dry stretch" methods. Typically such microporous film will be found to have a surface area of at least 10 sq.m/gm and preferably in the range of about 15 to 25 sq.m/gm. For films formed from polyethylene, the surface area generally ranges from about 10 to 25 sq.m/gm. and preferably about 20 sq.m/gm.

As stated herein, other microporous films having a surface greater than that of the microporous films obtained by either the "solvent stretch" or "dry stretch" methods may also be employed in the present invention.

Surface area may be determined from nitrogen or krypton gas adsorption isotherms using a method and apparatus described in U.S. Pat. No. 3,262,319. The surface area obtained by this method is usually expressed as square meters per gram.

In order to facilitate comparison of various materials, this value can be multiplied by the bulk density of the material in grams per cc. resulting in a surface area expressed as square meters per cc.

Once the microporous film is obtained by either of the above described methods the film may be converted to a variety of other derivative configurations such as a fiber, yarn, fabric, powder, laminate, sheet and granules all of which are included within the definition of "microporous adsorbent".

The microporous adsorbent of the present invention (when in the configuration of a film) can easily be shaped to the form of a laminate with a porous fabric or screen type backing and used as a pleated cartridge filter. The adsorbents thus obtained can advantageously be utilized as adsorbent-filters combining the functions of adsorption and filtration. The adsorbents according to this invention, therefore, have an ability to filter substances of small particle size, i.e., larger than the size of the micropores, as well as the ability to adsorb dissolved chlorine and halogenated hydrocarbons of much smaller size. Typical substances which may be filtered include fibrous matter, both inorganic and organic, sand, pipe scale, inorganic and organic particulates and the like.

The method of contacting the microporous adsorbent with the aqueous medium is not critical provided there is intimate contact between the adsorbent and the medium containing the halogenated substances described herein.

In one embodiment, the adsorbent and aqueous medium are contacted by placing the adsorbent in an aqueous medium for a period of time sufficient to adsorb the halogenated compounds present therein and removing the adsorbent by filtation or decantation after treatment. This method is particularly useful when it is necessary to store the aqueous medium for a long period of time, e.g., as during the fermentation of fruit juices. In another embodiment, the aqueous medium is stored in a container with stoppers or a container coated with a thin layer of the adsorbent. However, in order to achieve removal of the halogenated substance in a short period of time, it is preferred to use agitation or mixing. The above embodiments are conducted on a batch basis.

Alternatively, in semi-continuous or continuous embodiments the adsorbent is packed in a fixed column, or coated on a grid or the inside of a tube, and the aqueous medium allowed to flow or filter through. Preferably, the adsorbent of the present invention in this instance would be in the form of a cartridge device attachable to or locatable in a domestic or industrial water conduit. A representative example of a cartridge device is illustrated in commonly assigned U.S. Pat. No. 3,800,510 the disclosure of which is herein incorporated.

It has been found that in a preferred embodiment, the degree of adsorption by the microporous adsorbent may be enhanced by impregnating the micropores of the adsorbent with an organic solvent selected from the group consisting of oils, both saturated and unsaturated, fats and waxes.

Representative examples of oils include, mineral oil, silicone oils, cottonseed oil, castor oil, sesame oil, soybean oil, corn oil, pine oil, olive oil and other vegetable and animal oils as well as mixtures thereof.

Representative examples of fats include glyceryl esters of fatty acids such as steric, palmitic, oleic, lauric, linolenic, myristic, arachidic, palmitoleic, and mixtures thereof.

Suitable waxes include animal, vegetable, and synthetic waxes which are commonly known to comprise high molecular weight acids, alcohols, esters and saturated hydrocarbons with the esters being predominant.

Representative examples of vegetable waxes include carnauba wax, ouricury wax, palm wax, raffia wax, candelilla wax, sugar cane wax, Japan wax, esparto wax, cocoa butter and mixture thereof.

Representative examples of animal waxes include beeswax, beef tallow, sperm oil, chinese insect wax, wool wax, and mixtures thereof.

Representative examples of synethic waxes include ethylene polymers, polyol ether-esters, and chlorinated napthalenes.

In short, any saturated or unsaturated oil, wax or fat which is capable of solubilizing organic halogen containing compounds of the type described herein may be employed in the present invention provided it does not adversely influence the microporous adsorbent.

The preferred organic solvent is mineral oil.

Any method of impregnating the microporous adsorbent with the organic solvent may be used. For example, a general impregnating method of the prior art as described in Canadian Pat. No. 987,971 consists of first vacuum drying the film to remove residual moisture. The drying temperature will vary depending on such factors as the length of the drying cycle; the film plymer, etc., but usually ranges from about 25° C. to 65° C. With too low a temperature, the drying speed is excessively long while too high a temperature may cause premature void coalescence. The microporous adsorbent is then submerged in the impregnating organic solvent preferably while still under vacuum for a time sufficient to insure complete saturation, i.e., thorough penetration of the liquid impregnant. Of course, once the adsorbent is submerged, pressure may be utilized to accelerate the impregnation process.

An alternative method of impregnation can be achieved by dissolving the wax, oil or fat with a suitable low boiling solvent which would not alter the microporous structure. The solution can then be applied to the microporous adsorbent as described above or alternatively by dipping, roller coating, or spraying, followed by evaporation of the volatile solvent.

The treatment of the aqueous medium with the microporous adsorbent can be carried out at any convenient temperature, e.g., 0° to 100° C., or pressure, e.g., super-atmospheric, subatmospheric or atmospheric. The most convenient temperature is generally ambient temperature and the most convenient pressure is generally atmospheric.

The amount of microporous adsorbent employed to treat the aqueous medium is dependent in part on the method of contact and the amount of halogenated hydrocarbon or dissolved chlorine gas in the water.

Thus, when a batch method of contact is employed, although any effective amount of the microporous adsorbent may be utilized such amounts will generally constitute from about 0.01 to about 5%, typically from about 0.05 to about 1%, and preferably from about 0.1 to about 0.5% by weight of the adsorbent based on the weight of the aqeuous medium to be treated which contains the halogenated substances to be adsorbed.

The period of time during which the microporous adsorbent remains in contact with the aqueous media in a batch type process is also dependent in part on the method of contact utilized and on the concentration of the halogenated hydrocarbon compound in the aqueous media.

Accordingly, although any period sufficient to remove a desired quantity of the halogenated hydrocarbons from the aqueous media in a batch type process may be employed such periods will generaly constitute from about 0.25 to about 48 hours, typically from about 0.5 to about 24 hours and preferably from about 1 to about 10 hours.

Alternatively, when a continuous or semicontinuous method of contact is employed the appropriate amount of microporous adsorbent which is employed for adsorption and appropriate duration of contact with the aqueous media is achieved by controlling the flow rate of the aqueous media through the adsorbent in a manner sufficient to adsorb a given amount of halogenated substances. Such flow rates can easily be determined by one skilled in the art based on the description provided herein and the skill in the art.

The following examples are given as specific illustrations of the claimed invention. It should be understood, however, that the invention is not limited to the specific details set forth in the examples. All parts and percentages in the examples as well as in the specification and claims are by weight unless otherwise specified.

EXAMPLE 1

Part A

Part A of this example illustrates the preparation of a polyolefin microporous adsorbent film by the solvent stretch method as illustrated in U.S. Pat. No. 3,839,516.

Crystalline polyethylene resin having a melt index of 5.0; a weight average molecular weight of about 80,000, a density of 0.960 gm/cc, and a molecular weight distribution ratio of about 9.0 is prepared by the blown film extrusion method to form a precursor film (3 mil thick) and allowed to cool by quenching in air at 25° C. A sample of the resulting precursor film is then immersed for a period of 1 minute in trichloroethylene at 70° C. and subsequently stretched, while immersed in trichloroethylene maintained at a temperature of 70° C., at a strain rate of 150%/min. to 4 times its initial length (i.e., 300% total stretch). The trichloroethylene is then removed by evaporation and the sample allowed to dry in the air in the stretched state. Within a minute the sample becomes opaque which is indicative of micropores. Drying is carried out at 25° C. The surface area of the microporous film is between 10 and 25 sq. m/gm.

Part B

Part B of this example illustrates the preparation of a polyolefinic microporous adsorbent by the "dry stretch" method as illustrated by U.S. Pat. No. 3,801,404.

Crystalline polypropylene having a melt index of 10.7 and a density of 0.92 is melt extruded at 230° C. through an 8 inch slit die of the coat hanger type using a 1 inch extruder with a shallow metering screw. The length to diameter ratio of the extruder barrel is 24/1. The extrudate is drawndown very rapidly to a melt drawdown ratio of 150, and contacted with a rotating casting roll maintained at 50° C. and 0.75 inches from the lip of the die. The film produced in this fashion is found to have the following properties; thickness, 0.001 inches; recovery from 50 percent elongation at 25° C., 50.3 percent; crystallinity, 59.6 percent.

A sample of this film is oven annealed with air with a slight tension at 140° C. for about 30 minutes, removed from the oven and allowed to cool.

The sample of the annealed elastic film is then subjected to cold stretching at hot stretching at an extension ratio of 0.50:1, and thereafter heat set under tension, i.e., at constant length, at 145° C. for 10 minutes in air. The cold drawing portion is conducted at 25° C., the hot drawing portion is conducted at 145° C., total draw is 100 percent, based on the original length of the elastic film. The surface area of this film is between 10 and 25 sq. m/gm.

Part C

For run 1 of this Example 1.792 parts by weight of a chopped microporous film (the individual pieces having an average surface area of 6.25 cm$^2$ (and over 95% range from 5 cm$^2$ to about 7 cm$^2$) prepared by the "solvent stretch" method as illustrated in Part A, are placed in a container with 0.40 parts by weight of 50% wettable 1,1,1-trichloro-2, 2-bis(chlorophenyl) ethane (i.e., DDT) powder (i.e., 50% wettable refers to composition of DDT sample wherein about 50% thereof comprises inert filler) and 2000 parts by weight of water under agitation for 48 hours at room temperature and pressure. The microporous film having the DDT adsorbed thereon is then analyzed for chlorine content by common chromatographic techniques from which the percentage by weight of DDT originally added to the solution which is adsorbed by the film can be determined based on the known percentage of chlorine present in this compound. Thus, every part by weight of chlorine found to be present in the film represents about 2 parts by weight of DDT since the percentage by gmw of chlorine in DDT is about 50%. An analysis for chlorine content present in a microporous film sample having no DDT adsorbed thereon is also conducted to provide a control and to aid in the determination of the percentage of adsorbed DDT.

The results of these tests are set out in Table I as Run 1.

For Runs 2-11, the procedure of Run 1 is repeated utilizing microporous films prepared by both the "solvent stretch" and "dry stretch" methods as illustrated in Parts A and B above respectively, which are contacted with various chlorinated hydrocarbons as illustrated at Table I. To illustrate the preferred embodiment the microporous films of runs 2, 3, 5, 6, 7, 8, and 11 are impregnated with a variety of organic compounds to enhance the adsorptive properties of the film prior to contact with the chlorinated hydrocarbon. With the exception of run 6, such impregnation is achieved by dipping the microporous film samples in the selected impregnant and blotting the excess with adsorbent paper.

For Example 6, the tristerate is dissolved in methylene chloride and the microporous film dipped in the resulting solution. The methylene chloride is then evaporated from the impregnated microporous film in an oven maintained at a temperature between 60° and 70° C. having the tristerate impregnated in the film.

The results of Runs 2 to 11 are summarized at Table I.

thereof with a minor amount of a straight chain n-alkene.

TABLE I

| 1 | 2 | 3 | 4 | 5 | 6 | 7 | 8 | 9 | 10 | 11 | 12 |
|---|---|---|---|---|---|---|---|---|---|---|---|
| Run No. | Film type | Film impreg-nate | Wt. of film sample (gms) | Chlorinated hydrocarbon (C) Type | % Concen-tration | % Chlorine of film ex-posed to chlorinated hydrocarbon (K) | % Chlorine of control film (M) | % Chlorine in film adsorbed from solution (L) | Weight of Chlorine adsorbed (gms) | Weight of Chlorine of chlori-nated hydrocar-bon ori-ginally present in solution (gms) (N) | % of Chlorine of chlorinated hydrocarbon adsorbed by film (D) |
| 1 | A | None | 1.792 | H | .01 | .52 | .0253 | 0.495 | .00887 | 0.10 | 8.9 |
| 2 | A | D | 3.379 | H | .01 | .56 | .0064 | 0.554 | .0187 | 0.10 | 18.7 |
| 3 | A | E | 2.247 | H | .01 | .36 | .0285 | 0.332 | .0075 | 0.10 | 7.5 |
| 4 | B | None | 2.324 | H | .01 | .35 | .0162 | 0.334 | .0078 | 0.10 | 7.8 |
| 5 | B | D | 3.968 | H | .01 | 1.10 | .0164 | 1.084 | .0430 | 0.10 | 43.0 |
| 6 | A | F | 1.722 | H | .01 | .30 | .0085 | 0.291 | .0050 | 0.10 | 5.0 |
| 7 | A | G | 4.884 | H | .01 | .81 | .0095 | 0.801 | .0391 | 0.10 | 39.1 |
| 8 | A | F | 1.076 | I | .01 | .64 | .0074 | 0.633 | .0068 | 0.10 | 6.8 |
| 9 | A | None | 2.000 | J | .0050 | .97 | .0080 | .0962 | .0192 | 0.1017* 0.0488** | 39.3 |
| 10 | A | None | 2.000 | J | .0005 | .34 | .0080 | 0.332 | .0066 | 0.0098* 0.0470** | 14.1 |
| 11 | A | G | 2.003 | J | .0050 | 1.63 | .0080 | 1.622 | .0325 | 0.1002* 0.0481** | 67.5 |

A = Polyethylene microporous film provided by the "solvent stretch" method.
B = Polypropylene microporous film provided by the "dry stretch" method.
C = Concentration is expressed in terms of actual percentage of chlorinated hydrocarbon present in solution based on the weight of the water alone and does not include inert filler if any.
D = Mineral Oil.
E = Surfactant coated aerosol - ot.
F = Glyceryl tristearate (Stearin or tristearin).
G = Castor oil.
H = 1,1,1-trichloro-2,2-bis(chlorophenyl)ethane (i.e., DDT).
I = Arochlor 1268 (68% chlorine content).
J = Arochlor 1248 (48% chlorine content).
K = Percent by weight based on the total weight of film after contact with chlorinated hydrocarbon.
L = Percent by weight (Col. 7 - Co. 8).
M = Percent by weight based on the total weight of control film.
N = Percent by gram molecular weight based on the total weight of chlorinated hydrocarbon (excluding filler) present in solution.
O = Percentage listed is calculated value taking into account chlorine content of control film.
*AROCHLOR$^{TM}$ weight in grams
**Grams of chlorine based on the total weight of AROCHLOR$^{TM}$ (assuming a chlorine content therein of 48% by weight).

As may be seen from the results of Table I the microporous films prepared by either the "solvent stretch" or "dry stretch" methods adsorbed considerable chlorinated material. The efficiency of the microporous adsorbent is improved to varying degrees, however, by impregnating the film with various organic solvents as defined herein.

Although the invention has been described with preferred embodiments, it is to be understood that variations and modifications may be resorted to as will be apparent to those skilled in the art. Such variations and modifications are to be considered within the purview and scope of the claims appended hereto.

What is claimed is:

1. A process for removing non-polymeric halogenated hydrocarbons and molecular and elemental halogens selected from at least one member of the group consisting of chlorine, fluorine, bromine, and iodine, from an aqueous medium which comprises contacting said aqueous medium with a polyolefinic microporous adsorbent having a surface area of from about 10 to about 40 square meters per gram of adsorbent selected from at least one member of the group of films, fibers, yarn, sheets, fabrics and laminates, said polyolefinic adsorbent comprising an olefinic polymer selected from the group consisting of ethylene homopolymers, propylene homopolymers, poly-3-methylbutene-1, poly-4-methylpentene-1, copolymers thereof, and copolymers 2. The process of claim 1 wherein the halogenated hydrocarbon is selected from at least one member of the group consisting of aliphatic, cycloaliphatic, heterocyclic, aromatic, and alkyl substituted aromatic, hydrocarbons having from 1 to 30 carbon atoms.

3. The process of claim 1 wherein the aqueous medium contains a halogenated hydrocarbon in amounts of from about 0.001 to about 10 ppm.

4. The process of claim 1 wherein the aqueous medium is selected from at least one member of the group consisting of waste water, municipal tap water, fermented and non-fermented fruit juices, carbonated beverages, and milk.

5. The process of claim 1 wherein the microporous adsorbent is a microporous film prepared by the "dry stretch" or "solvent stretch" method.

6. A process for removing non-polymeric halogenated hydrocarbons from an aqueous medium containing about 0.001 ppm to about 10 ppm of said halogenated hydrocarbons which comprises contacting said aqueous medium with from about 0.01 to about 5% by weight, based on the weight of said aqueous medium of a polyolefinic microporous adsorbent having a surface area of from about 10 to about 40 square meters per gram of adsorbent selected from at least one member of the group consisting of films, fibers, yarn, sheets, fabrics and laminates, said polyolefinic adsorbent comprising an olefin polymer selected from the group consisting of ethylene homopolymers, propylene homopolymers, poly-3-methylbutene-1, poly-4-methylpentene-1, copolymers thereof, and copolymers thereof with a minor amount of a straight chain n-alkene.

7. The process of claim 6 wherein the microporous adsorbent is a microporous film provided from polymers selected from the group consisting of polyethylene and polypropylene.

8. The process of claim 6 wherein the aqueous medium containing the halogenated hydrocarbon is selected from at least one member of the group consisting of waste water, municipal tap water, fermented and unfermented fruit juices, carbonated beverages, and milk.

9. The process of claim 6 wherein the microporous adsorbent is a microporous film prepared by the "dry stretch" or "solvent stretch" method.

10. A process for removing halogented hydrocarbons selected from at least one member of the group consisting of aliphatic, cycloaliphatic, heterocyclic, aromatic, and alkyl substituted aromatic, hydrocarbons having from 1 to 20 carbon atoms from an aqueous medium containing about 0.01 ppm to about 10 ppm of said halogenated hydrocarbon with from about 0.01 to about 5% by weight, based on the weight of the aqueous medium of a polyolefinic microporous adsorbent having a configuration selected from at least one member of the group consisting of a film, fiber, laminate, yarn, sheet and fabric, having a surface area of from about 20 to about 40 square meters per gram of adsorbent, and comprising an olefin polymer selected from the group consisting of ethylene homopolymers, propylene homopolymers, poly-3-methylbutene-1, poly-4-methylpentene-1, copolymers thereof, and copolymers thereof with a minor amount of a straight chain n-alkene.

11. The process of claim 10 wherein the microporous adsorbent is provided from polymers selected from the group consisting of polypropylene, and polyethylene.

12. The process of claim 10 wherein the microporous adsorbent is a microporous film prepared by the "dry stretch" or "solvent stretch" method.

13. A process for removing halogen containing substances selected from at least one member of the group consisting of (a) non-polymeric halogenated hydrocarbons and (b) molecular and elemental halogens selected from at least one member of the group consisting of chlorine, fluorine, bromine, and iodine from an aqueous medium containing about 0.001 ppm to about 10 ppm of said halogen containing substances which comprises (a) impregnating a polyolefinic microporous adsorbent comprising a microporous film prepared by the "dry stretch " or "solvent stretch" method from an olefin polymer selected from the group consisting of ethylene homopolymers, propylene homopolymers, poly-3-methylbutene-1, poly-4-methylpentene-1, copolymers thereof, and copolymers thereof with a minor amount of a straight chain n-alkene and having a surface area from about 10 to about 25 square meters per gram of adsorbent with an organic solvent selected from at least one member of the group consisting of saturated and unsaturated oils, waxes, and fats; and (b) contacting said aqueous medium with said microporous adsorbent having the organic solvent impregnated therein.

14. The process of claim 13 wherein the saturated and unsaturated oil impregnants are selected from at least one member of the group consisting of mineral oil, silicone oils, cottonseed oil, and castor oil.

15. The process of claim 14 wherein the wax impregnant is selected from at least one member of the group consisting of animal, vegetable and synthetic waxes.

16. The process of claim 13 wherein the fat impregnant comprises at least one glyceryl ester of fatty acids.

17. The process of claim 13 wherein the halogenated hydrocarbon is selected from at least one member of the group consisting of aliphatic, cycloaliphatic, heterocyclic, aromatic and alkyl substituted aromatic hydrocarbons having from 1 to 30 carbon atoms.

* * * * *